United States Patent
Murphy et al.

(10) Patent No.: US 8,981,306 B2
(45) Date of Patent: Mar. 17, 2015

(54) SCINTILLATOR ARRAYS AND METHODS OF MAKING SCINTILLATOR ARRAYS

(71) Applicant: General Electric Company, Schenectady, NY (US)

(72) Inventors: James Edward Murphy, Niskayuna, NY (US); Kevin Paul McEvoy, Ballston Spa, NY (US)

(73) Assignee: General Electric Company, Schenectady, NY (US)

(*) Notice: Subject to any disclaimer, the term of this patent is extended or adjusted under 35 U.S.C. 154(b) by 86 days.

(21) Appl. No.: 13/716,948

(22) Filed: Dec. 17, 2012

(65) Prior Publication Data

US 2014/0166887 A1 Jun. 19, 2014

(51) Int. Cl.
*G01T 1/20* (2006.01)

(52) U.S. Cl.
CPC ............. *G01T 1/2006* (2013.01); *G01T 1/2018* (2013.01)
USPC ........................................................ 250/366

(58) Field of Classification Search
USPC ....................................................... 250/366
See application file for complete search history.

(56) References Cited

U.S. PATENT DOCUMENTS

| | | | |
|---|---|---|---|
| 6,495,845 B1 | 12/2002 | Tsunota et al. | |
| 6,519,313 B2 * | 2/2003 | Venkataramani et al. | 378/19 |
| 6,556,602 B2 | 4/2003 | Rice et al. | |
| 7,105,832 B2 | 9/2006 | Dai et al. | |
| 7,164,134 B2 | 1/2007 | Wei et al. | |
| 7,308,074 B2 | 12/2007 | Jiang et al. | |
| 7,310,405 B2 * | 12/2007 | Venkataramani et al. | 378/19 |
| 7,384,158 B2 | 6/2008 | Ramachandran et al. | |
| 7,907,809 B2 | 3/2011 | Korampally et al. | |
| 2003/0021374 A1 * | 1/2003 | Venkataramani et al. | 378/19 |
| 2007/0165219 A1 * | 7/2007 | Natan et al. | 356/301 |
| 2008/0209876 A1 | 9/2008 | Miller | |
| 2010/0127180 A1 * | 5/2010 | Lifshitz et al. | 250/367 |
| 2011/0024685 A1 * | 2/2011 | Clothier et al. | 252/301.4 S |
| 2011/0114847 A1 * | 5/2011 | Fujieda et al. | 250/370.09 |
| 2012/0001078 A1 * | 1/2012 | McEvoy et al. | 250/366 |
| 2012/0112075 A1 * | 5/2012 | Noda | 250/361 R |

OTHER PUBLICATIONS

Lou et al., "Solgel Waveguide Thin Fillm of YBO3: Preparation and Characterization", Optical Materials, vol. 15, Issue 1, pp. 1-6, Sep. 2000.

(Continued)

*Primary Examiner* — David J Makiya
*Assistant Examiner* — Taeho Jo
(74) *Attorney, Agent, or Firm* — The Small Patent Law Group LLC; Dean Small

(57) ABSTRACT

Scintillator arrays and methods of making scintillator arrays are provided. One scintillator array includes a scintillator substrate having a plurality of scintillators spaced apart by gaps within the scintillator substrate and a smoothing layer overlaying a surface of the scintillator substrate within the gaps. The smoothing layer includes an organically modified silicate. The scintillator array also includes an optical reflector layer overlaying a surface of the smoothing layer within the gaps.

19 Claims, 12 Drawing Sheets

(56) References Cited

OTHER PUBLICATIONS

Chipaux et al., "Sol-gel coating of scintillating crystals", IEEE Transactions on Nuclear Science, vol. 47, Issue 6, pp. 2020-2023, Dec. 2000.

Shang, "Solution based Synthesis of Cadmium Tungstate Scintillation Films", ProQuest Dissertations And Theses, vol. 67-07, pp. 4049, 2006.

Sobajima et al., "Novel Light-trapping Structure having Smooth Surface for Silicon Thin-Film Solar Cell", 33rd IEEE Photovoltaic Specialists Conference, pp. 1-6, May 11-16, 2008.

Surpi et al., "Surface Roughness Reduction in X-ray Mirrors via Sol-Gel Silica Coatings", Optics Communications, vol. 281, Issue 11, pp. 3217-3220, Jun. 1, 2008.

Han et al., "Sol-gel preparation and characterization of transparent $GdTaO_4$: $Eu^{3+}$ thick films", Proceedings of SPIE—Sixth International Conference on Thin Film Physics and Applications, vol. 6984, 2008.

* cited by examiner

| Sample-pixel | Sa | Sq |
|---|---|---|
| 0726A3 p1 | T = 0.0360<br>M = 0.1362<br>B = 0.1540 | T = 0.0450<br>M = 0.1682<br>B = 0.1942 |
| 0726A3 p2 | T = 0.0377<br>M = 0.0248<br>B = 0.1733 | T = 0.1189<br>M = 0.0313<br>B = 0.2228 |
| 0726A3 AVERAGE | T = 0.03685<br>M = 0.0850<br>B = 0.1636 | T = 0.0819<br>M = 0.100<br>B = 0.2085 |
| 0726A3 AVG/ Uncoated AVG | T = 6.5x<br>M = 3.3x<br>B = 1.6x | T = 4.0x<br>M = 3.5x<br>B = 1.6x |

United States Patent US 8,981,306 B2

SCINTILLATOR ARRAYS AND METHODS OF MAKING SCINTILLATOR ARRAYS

BACKGROUND

X-ray detectors may be used in a variety of different applications, such as for x-ray Computed Tomography (CT) imaging. In CT imaging systems, an x-ray source and a detector array are rotated about a gantry within an imaging plane and around the subject. The x-ray source, typically x-ray tubes, emits a fan-shaped beam toward a subject or object, such as a patient or piece of luggage. The beam, after being attenuated by the subject, impinges upon an array of radiation detectors.

X-ray detectors typically include a collimator for collimating x-ray beams received at the detector, a scintillator array, and photodiodes. In operation, each scintillator of the scintillator array converts x-rays to light energy, which each scintillator then discharges to an adjacent photodiode. Each photodiode detects the light energy provided and generates a corresponding electrical signal. The outputs of the photodiodes are then transmitted to a data processing system for image reconstruction.

With respect to the scintillator array, current CT detector configurations include a pixelated ceramic of a scintillator material. In these scintillator arrays, the wafers are cut (e.g., using a wire saw) to form pixelated structures, forming a space or gap between the pixels which is also known as a kerf. In conventional designs, the kerf may be filled with an epoxy containing a reflecting or absorbing material.

However, as a result of the cutting and the coating and drying or curing process of the pixelated scintillator structure, a surface roughness, particularly around or along the edges of the pixels, may exist. This roughness causes additional scattering and adversely affects the performance of the scintillator array.

SUMMARY

In one embodiment, a scintillator array is provided that includes a scintillator substrate having a plurality of scintillators spaced apart by gaps within the scintillator substrate and a smoothing layer overlaying a surface of the scintillator substrate within the gaps. The smoothing layer includes an organically modified silicate. The scintillator array also includes an optical reflector layer overlaying a surface of the smoothing layer within the gaps.

In another embodiment, a method for producing a coated scintillator array is provided. The method includes synthesizing an inorganic silica sol and synthesizing an organically modified silicate (ormosil) sol using a reaction of copolymerizing 3-glycidoxypropyltrimethoxysilane (GPTMS) with the inorganic silica sol. The method also includes coating a scintillator array with the ormosil sol and drying and curing the coated scintillator array.

DETAILED DESCRIPTION

Figure 1:
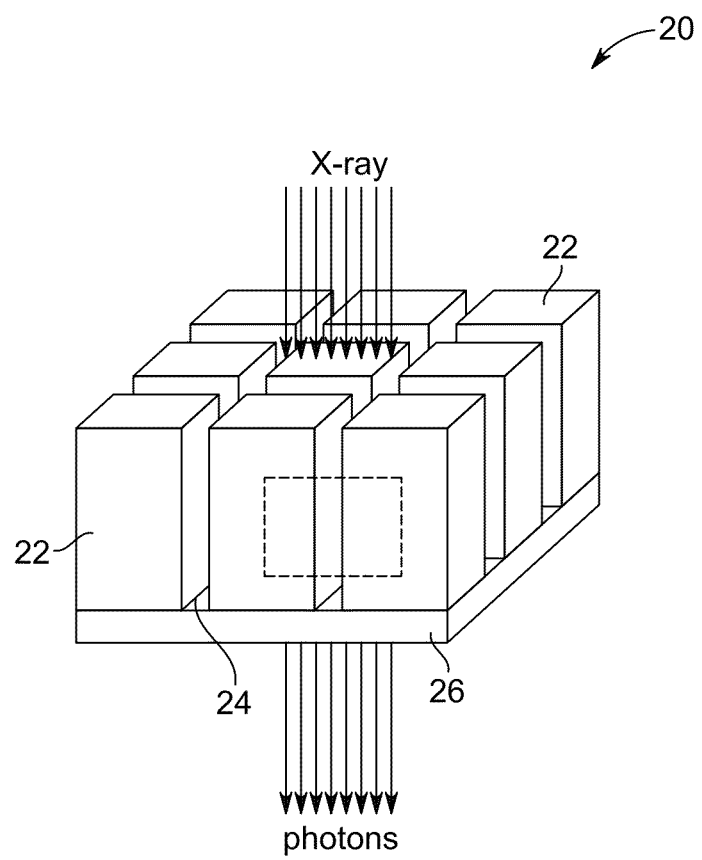
FIG. 1 is a perspective view of a pixelated scintillator array in accordance with an embodiment showing gaps between scintillators.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers, circuits or memories) may be implemented in a single piece of hardware or multiple pieces of hardware. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide scintillator arrays and methods for making scintillator arrays. In particular, various embodiments provide a solution gel (sol gel) coating of scintillator pixels. The sol gel of various embodiments may be applied, for example, as a transparent film or an active optical film.

As used herein, "sol" generally refers to a stable dispersion of colloidal particles in a liquid, wherein colloids are solid particles ranging in diameter, for example, from 1-1000 nanometers (NM), typically containing between $10^3$ and $10^9$ atoms. As used herein, a gel generally refers to a rigid network of interconnected material with pores of submicrometer to nanometer dimensions and long polymeric chains. Also, as used herein, alcogel generally refers to gels formed via alcohol-based processes and a dried gel is formed when the physisorbed water is removed from the gel.

By practicing various embodiments, reduced cracking during the making of the scintillator pixels may result, which results in improved light output from the scintillator array. For example, in various embodiments, a coated scintillator array is formed, such as for an x-ray Computed Tomography (CT) imaging system. However, it should be noted that the scintillator array may be used in different applications and is not limited to detectors for x-ray CT imaging.

In particular, various embodiments provide a pixelated scintillator array 20 as shown in FIG. 1, which may be formed, for example, from a garnet scintillator material. However, other scintillator materials may be used. The pixelated scintillator array 20 includes a plurality of scintillator having pixels 22 that may be made, for example, by sawing into the scintillator material using any suitable cutting process. The pixels 22 are spaced apart by gaps 24, also referred to as kerfs. The gaps 24 may have different dimensions as desired or needed. In one embodiment, the gaps 24 have a width of about 0.1 millimeters (mm) and a height of about 3 mm. However, other widths and heights, as well as relative dimensions may be provided. It should be noted that the scintillator material forming the scintillator structure may be supported during the manufacture process by a base 26. It further should be noted that the gaps 24 generally extend partially into the scintillator material and form channels, such as in the x and z directions along the scintillator material.

Generally, the scintillator array 20 is coated with a thin film of an inorganic/organic hybrid silica containing sol (also known as a smooth coat) and a highly reflective metal. The remainder of the gap 24 between the pixels 22 is filled with an x-ray absorbing material, such as a high-Z (atomic number) filler material to reduce or minimize cross talk between pixels 22.

Figure 2:
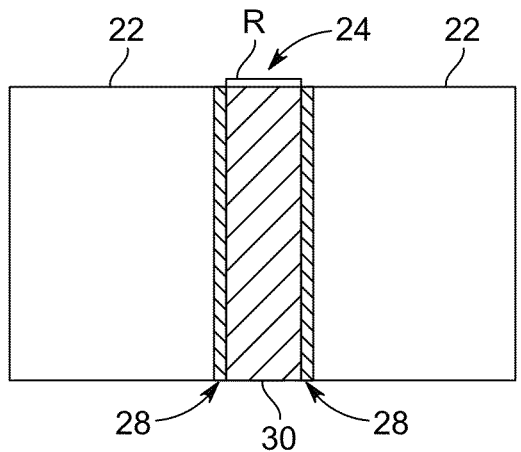
FIG. 2 is a schematic side view of a gap between two scintillators of the scintillator array of FIG. 1 having a plurality of coating layers.
Figure 3:
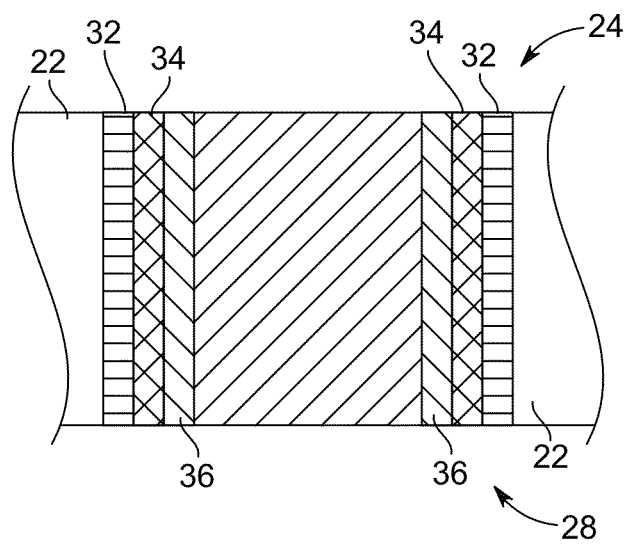
FIG. 3 is a schematic side view of the gap of FIG. 2 showing a smoothing layer of various embodiments in combination with other layers and a filler.

In one embodiment, as shown in FIG. 2, illustrating the gap 24 between two adjacent pixels 22, the gap 24 is coated with a plurality of layers 28 as described in more detail herein, with the x-ray absorbing material 30 filling the remainder (R) of the gap 24. FIG. 3 illustrates an exploded view of the gap 24. It should be noted that the relative dimensions are not necessarily the same in the various Figures in order to better illustrate the different layers.

With particular reference to FIG. 3, the plurality of layers 28 includes a smoothing layer 32 adjacent and/or overlaying (e.g., coated or abutting) the pixels 22 (e.g., formed or deposited on the surface of the pixels 22 within the gaps 24) and an optical reflector layer 34 overlaying the smoothing layer 32. The smoothing layer 32 reduces the surface roughness of the surfaces of the scintillator array 20 material within the gaps 24, for example, by filling in rough surfaces. In various embodiments, the smoothing layer 32 is formed from an inorganic/organic hybrid silica containing sol, which in various embodiments, includes an organically modified alkoxysilane coupling agent, which in one embodiment is 3-glycidoxypropyltrimethoxysilane (GPTMS) added to a silica sol, such as tetraethylorthosilicate (TEOS). Thus, in various embodiments, the smoothing layer 32 is formed from an organic containing silicate also referred to as an organically modified silica or organically modified silicate (ormosil). Accordingly, in some embodiments, as used herein, ormosils generally refer to organically modified silicates.

Figure 4:
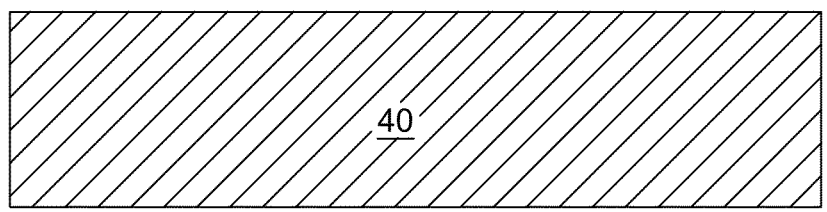
FIG. 4 is a schematic side view of a scintillator substrate in accordance with an embodiment.

A passivation layer 36 also optionally overlays the optical reflector layer 34. The manufacture of the scintillator array 20 including each of the coating layers and the process for making these layers will be described in more detail below. With reference to FIG. 4, the manufacturing process or technique begins with the formation of a scintillator substrate 40. The scintillator substrate 40 comprises one or more materials designed to illuminate and output light upon the reception or impinging thereon of x-rays or other radiographic imaging energy. The substrate 40 may be fabricated in accordance with one of a number of semiconductor fabrication techniques know in the art. It should be noted that in various embodiments, the bulk substrate material may be ground into a wafer having a desired thickness as well as grinding or other processes to dimensionally define the substrate.

Figure 5:
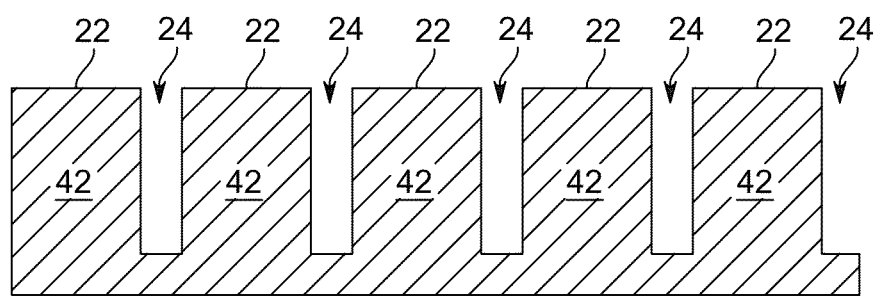
FIG. 5 is a schematic side view of the scintillator substrate of FIG. 4 with gaps in accordance with an embodiment.

The substrate 50 undergoes one of a number of pixelating processes to define a number of scintillators 42 in the substrate 40 that form the pixels 22 as shown in FIG. 5. For example, the substrate 50 may be diced using a wire saw dicer or other dicing mechanism. Additionally, the individual scintillators 42 may be defined using ion beam milling, chemical etching, vapor deposition, or any other suitable substrate cutting technique. The individual scintillators 42 are defined such that the gap 24 is formed between adjacent scintillators 42. Additionally, the scintillators 42 are defined three-dimensionally across the scintillator substrate 40 in various embodiments. In some embodiments, the gaps 24 extend between individual scintillators 42 in both the x and z directions and have a width. The depth of the gaps 42 may be provided, for example, based on the stopping power desired and varies according to scintillator substrate composition.

Figure 6:
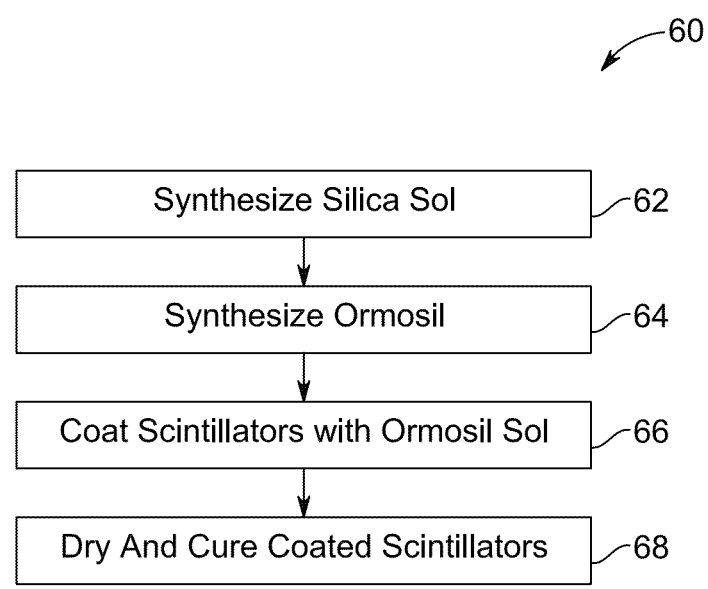
FIG. 6 is a flowchart of a method for coating a scintillator array in accordance with various embodiments.

The various embodiments provide the plurality of layers 28 and the x-ray absorbing material 30 filling the gaps 42. In particular, FIG. 6 illustrates a method 60 for coating a scintillator array, including providing the smoothing layer 32, which in various embodiments is an ormosil. In particular, the method 60 includes synthesizing a silica sol at 62. In general, the synthesis includes forming a suspension of silica that is the precursor to the TEOS. Specifically, the first step in synthesizing a smooth coat is to form a silica sol via a series of hydrolysis, condensation and polycondensation reactions. The first reaction that occurs in forming the silica sol is an acid catalyzed hydrolysis reaction which involves heating a liquid alkoxide precursor known as tetraethylorthosilicate (TEOS), $Si(OC_2H_5)_4$, with a solution of ethanol, water and HCl. The balanced equation for this hydrolysis reaction is shown in the following equation:

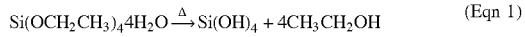

(Eqn 1)

It should be noted that in some embodiments the reaction may also occur via a base-catalyzed reaction whereby the hydroxyl ion has high nucleophilic power and is able to attack the Si atom directly. Base catalyzed reactions result in less dense gels having larger pore sizes.

Next, the hydrated silica tetrahedral formed from Equation 1 interacts in an exothermic condensation reaction (shown in Equation 2), forming ≡Si—O—Si≡ bonds:

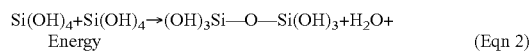

(Eqn 2)

In this process, $SiO_2$ networks eventually form via the linkage of additional silanol (≡Si—OH) bonds via polycondensation reactions as shown in Equation 3:

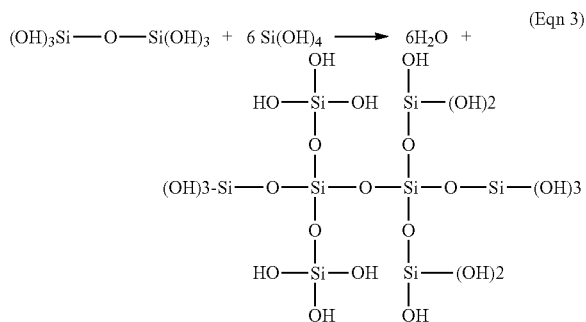

The size of the resulting sol particles and the cross-linking within the particles depend upon several variables such as pH, temperature, nature of the alcohol solvent, and TEOS, acid and water concentrations. In one embodiment, this series of reactions resulting in a silica sol are performed over a two to three hour period at 75° C. However, in other embodiments, the reactions may occur over a greater or lesser time period and at temperature above or below 75° C. Under the acid-catalyzed conditions and higher temperatures used, the hydrolysis reaction occurs at a rapid rate and is near completion early in sol formation while the polycondensation reaction occurs more slowly, continuing to occur even in the dried gel network as long as neighboring silanol groups are close enough to react. It should be noted that the resulting sol may be stored, for example, in a sealed polyethylene bottle in a refrigerator or used immediately in step 64 described below.

In particular, the method 60 also includes synthesizing an ormosil at 64. Specifically, dried gels formed from the resulting silica sols from step 62 may suffer from extensive cracking. In various embodiments, a more uniform coating with less cracking may be formed through the addition of GPTMS, 3-glycidoxypropyltrimethoxysilane, an organically modified alkoxysilane coupling agent. GPTMS is a trifunctional monomer having three methoxy groups that are capable of copolymerizing with the inorganic TEOS-based silica sol, thereby producing organic/inorganic hybrid silicate networks (ormosils). In various embodiments, these hybrid materials improve the mechanical properties of resulting films by improving adhesion and flexibility (relative to inorganic silica networks) while also having an improved scratch resistance and higher density over other organic coatings.

The hybrid sol formed in one embodiment includes heating the silica sol synthesized from step 62 with GPTMS in a 4 to 5 TEOS:1 GPTMS molar ratio at 40° C. for 3-4 hours. However, in other embodiments, different ratios, temperatures and/or time periods may be used. It should be noted that in some embodiments, the ratio is less than or equal to about 5.5 TEOS:1 GPTMS molar ratio. Additionally, it should be noted that in one embodiment, the formed ormosil sols are used to coat the scintillators 42 (shown in FIG. 5) within a 3-4 days as polycondensation reactions continue to occur even at low temperatures which result in an increase in viscosity and eventual gelation of the sol.

It further should be noted that GPTMS may be combined with TEOS in a one-step coating approach, but by splitting the reaction into two steps, the window to coat the scintillators 42 is longer.

As one example, the ormosil may be formed as follows:
1. Stock HCl solution is prepared as follows:
   A. Add 200 ml high purity DI Water to a clean 250 mL nalgene bottle.
   B. Pipet in 3.64 ml of concentrated HCl (12.1 N)
2. Stock ethanol:$H_2O_2$ cleaning solution is prepared as follows:
   A. Use a 200 ml glass beaker, with stir bar on stir plate.
   B. Add 100 ml 200 proof ethanol.
   C. Start stirring at 200 rpm.
   D. Pipet in 17.5 ml 30% Hydrogen Peroxide.
   E. Stir for 15 minutes covered with a watch glass.
   F. Transfer into 125m1 poly bottle labeled as 10% solution of ethanol:$H_2O_2$.
3. Silica Sol Preparation from TEOS precursor is performed as follows:
   It should be noted that any object contacting the TEOS or GPTMS is cleaned with 0.5 M KOH water solution, for example, stir bars, glassware, tubing for coater, etc.
   A. Place a stir bar in a 1000 ml round bottom flask which sits in a heating mantle on a stir plate.
   B. Transfer 187 ml of 200 proof Ethanol into flask.
   C. Start stirring at 250 rpm.
   D. Add 220 ml of TEOS to the flask.
   E. Place reflux condenser on the top of the flask, ensure adequate water flow.
   F. Start heating to 65° C.
   G. Once the temp is 65° C. add slowly, by replace reflux condenser with equalizing funnel, 97 ml of HCl stock solution from above. It should be noted that this hydrolysis reaction is exothermic.
   H. Replace funnel with condenser, heat for 2 hours at 75° C., then cool, which stops the reaction.
   I. Transfer, when cool to 500 milliliter (ml) poly bottle, and use immediately for the next step in the method 60 or store in refrigerator.
4. Solvent Cocktail is prepared as follows:
   A. Use a clean 250 mL poly bottle.
   B. Pipette in 20 mL of isopropyl alcohol.
   C. Pipette in 95 mL of methanol.
   D. Pipette in 30 mL of n-butanol.
   E. Pipette in 8 mL of acetic acid.
   F. Pipette in 4 mL of stock HCl solution from step 1.
   G. Pipette in 6 mL of DI water.
   H. Cap the nalgene bottle, shake the mixture and label bottle.
5. Inorganic/Organic Hybrid Sol Synthesis is performed as followed:
   A. Set up a 300 ml round flask using heating mantle and reflux condenser.
   B. Transfer in 100 ml of the TEOS sol from step C.
   C. Add spin bar, start stirring at 250 rpm.
   D. Pipette in 24 ml of GPTMS.
   E. Add 80 mL of the solvent cocktail prepared in step 4. pH should be between 2.5-3. Add additional HCl stock if pH is above 3 at the beginning of the reaction.
   F. Heat to 40 C while refluxing for 3 hours.
   G. Turn off heat and continue stirring until the sol reaches room temperature.
   H. Transfer to poly bottle and store in refrigerator.
   I. Use to coat scintillators 42 within a few days. Measure the viscosity and pH before coating as both increase with time. In one embodiment, the scintillators 42 are coated when the viscosity is 2.2-3.5 centipoise (cP), and the pH=3-4.

It should be noted that the some of the steps may be performed concurrently or in a different order as desired or needed. Additionally, the parameters for the steps, including the fluid amounts, temperatures, time periods, etc. may be varied.

Figure 7:
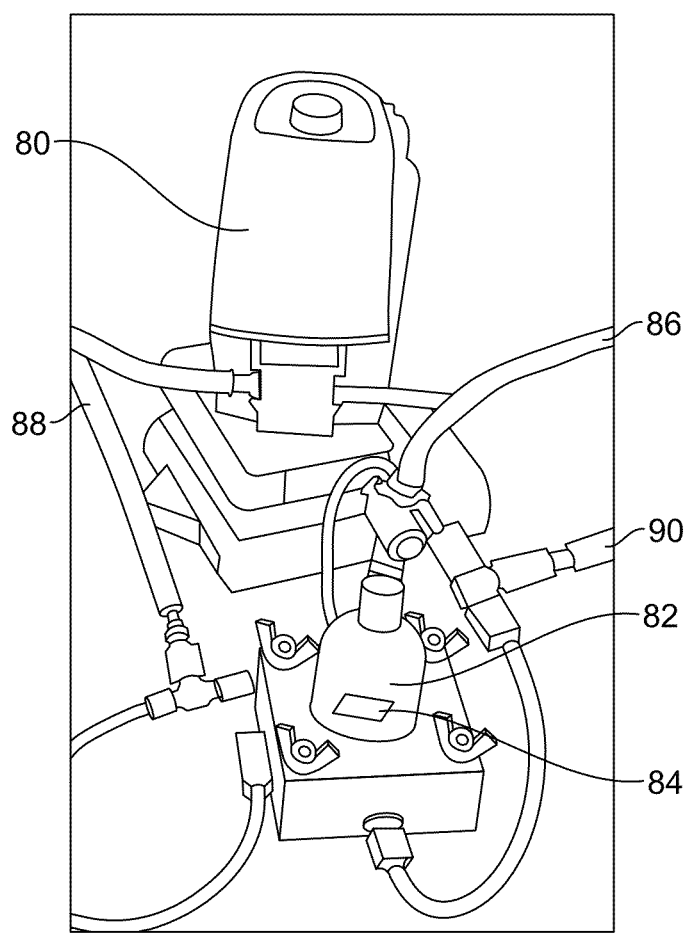
FIG. 7 is a diagram illustrating a pump used for applying a coating in accordance with an embodiment.

The method 60 includes coating the scintillators 42 with the ormosil sol at 66. The coating of the scintillators may be performed using different methods of various embodiments. In particular, one coating process includes using a peristaltic pump/vacuum 80 as shown in FIG. 7. It should be noted that the peristaltic pump/vacuum 80 described is merely for example, and other pump/vacuum systems may be used. In operation, the peristaltic pump/vacuum 80 is used to circulate the sol gel into a jar 82 (e.g., a bell jar) containing the pack 84 (scintillators 42) with the pixel 22 side up. The sol gel is pumped from a container through flexible tubing 86 to the top of the jar 82 and then drips down a distance, for example, of a few inches onto the pack 84. It should be noted that the drip distance may be varied or in some embodiments no dripping is provided. The excess sol gel that dripped over the pack 84 is then circulated back through a return line 88 into the original vessel such that the sol gel may be used again to coat multiple packs 84. After several minutes (e.g., 3-5 minutes) of dripping the sol over the pack 84, the pump 80 is turned off, valves to the pump 80 closed and a valve 90 to a vacuum pump opened such that, for example, a few quick or rapid bursts of vacuum are provided into the jar 82 to remove excess sol gel in the pack 84 that potentially could clog the kerf (e.g., the gaps 24 shown in FIG. 1).

Figure 8:
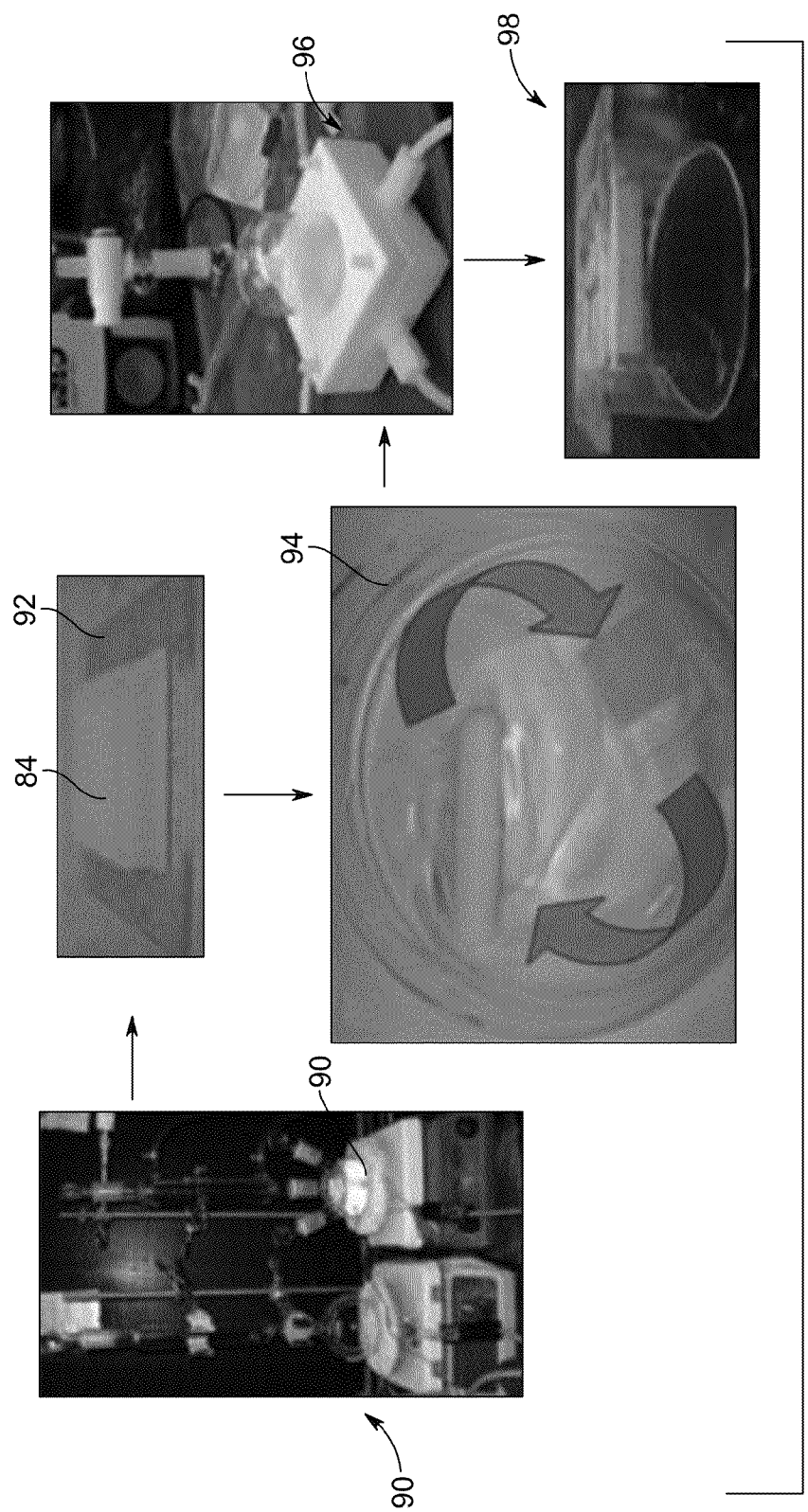
FIG. 8 is a diagram illustrating a coating method in accordance with an embodiment.

As another example, as shown in FIG. 8, a magnetically stirred sol bath may be used. In this embodiment, the formulation of the sol is changed to lower the viscosity such that more water, a slightly lower pH (e.g., between 3-4), a lower TEOS:GPTMS molar ratio and/or a mixture of alcohol solvents (ethanol, isopropyl alcohol, n-butanol, methanol) is used. This lower viscosity sol (in one embodiment, about three times that of water instead of the initially developed sol which had a viscosity of about 7 times that of water) may be used to improve kerf penetration and decrease cracking of the resulting coatings. By practicing this embodiment, with the lower viscosity sol, penetration into the kerf may be less difficult and allows for less elaborate and more efficient coating techniques to be used.

One process that increases the rate of the development of the smooth coat process while also using less, for example, about half of the amount of previous material is accordingly shown in FIG. 8. First, a plurality (two are shown for illustration) glass jars 90 are used to provide reactions that occur simultaneously or concurrently, such as on a smaller scale. Next, after cleaning the pack 84 in an ethanol/$H_2O_2$ solution, an adhesive (e.g., extra strength double tape) is used to mount the pack 84 to a microscope slide 92, which in one embodiment is a 1.5×1 inch microscope slide, which reduces or minimizes clogging of the kerf that sometimes may occur at the top of the pixels 22 when the pack 84 is dried pixel side up. Drying the packs 84 pixel side down results generally in less plugging of the kerf, and the glass slide 92 facilitates hanging the coated packs 84 pixel side down without ruining the sol gel coat. Then, the mounted and cleaned packs 82 are placed in a petri dish 94 (covered with a watch glass to minimize splashing) containing the inorganic/organic sol and stirred magnetically in a vigorous fashion. In certain instances, after removal from the petri dish, the coated pack 84 may be placed under vacuum using a vacuum device 96 for short periods of time to remove excess sol. However, it in lower viscosity sols this step may be skipped. It should be noted that drying packs 84 for long periods of time by vacuum increased the evaporation rate excessively and may result in crack formation. Finally, the coated pack 84 is hung pixel side down (e.g., for 12-24 hours) to dry as illustrated at 98. It should be noted that in some embodiments, the viscosity of the sol may be decreased even further and combined with multiple coats as well as using wetting agents to improve the wetability of the scintillator pack 84.

As another example of a coating process, a sonication in a sol gel bath may be provided. In this embodiment, the packs 84 are coated with a lower viscosity sol whereby the pack 84 is submersed in the sol and then sonicated for 5 minutes. However, the submersion may be for greater or lesser time periods. The other processing steps may be performed similar to the magnetically stirred sol bath process described above.

Referring again to FIG. 6, the method further includes at 68 drying and curing the coated scintillators, for example, the packs 84. In particular, a dried gel formation is provided. Specifically, after coating, a significant amount of solvent remains in the pores of the sol gel. Cracking occurs because of an increase in the tensile drying stress ($\sigma_x$) resulting from the difference in shrinkage rate between the inside and outside of a drying sol gel in accordance with the following equation.

$$\sigma_x \approx \eta_L V_E / 3D \qquad (Eqn\ 4)$$

where $\eta_L$=the viscosity of the liquid, $V_E$ is the evaporation rate, and D is the permeability of the network.

Accordingly, for a coating that is thick, viscous, and having small pore sizes (e.g., acid catalyzed alkoxide gels can have pores less than 5 nm), the tensile drying stress is high and cracking during drying is more likely to occur. So, the changes made to the composition of the sol gel not only helps in the coating process, but results in thinner coatings that have a reduced likelihood of cracking. It should be noted that crack-free quantum dot films, using mixtures of solvents also result in less cracking of the dried coatings. Again, coated packs 84 in various embodiments are dried with pixels facing downward (to reduce or minimize plugging the pores).

The scintillators are then cured. In particular, in one embodiment, once the packs 84 are coated and dried under ambient conditions, the glass microscope mount is removed (to avoid ashing of the tape during curing and metallization steps), and the packs 84 placed in a furnace and cured at 150° C. to remove physisorbed water. It should be noted that a slow ramp rate in both ramping up to the soaking temperature and ramping down to room temperature are provided to prevent or reduce the likelihood of thermal stresses from cracking the coat. In one embodiment, a 1° C./min ramp both before and after a three hour soak time is used. However, it should be noted that different temperature, timing and ramp rates may be used.

It also should be noted that towards the end of the process the ramp rate during the CVD metallization process may be around 5° C./min and the rate is decreased to 1° C./min. Finally, because the packs 84 are metalized at 240° C. in some embodiments, the cure temperature may be raised to this temperature.

It should be noted that variations and modifications to the various embodiments may provide sol gel systems that apply as, for example, a transparent film (or layer) or an active optical film (or layer). Different materials may be used to generate the different films. For example, the transparent films may be made from the following:

1. YAG based sol from an alcohol solubilized 2,4 pentadione precursors, of yttrium and alumina.
2. Ytterbium based system from alcohol solubilized YB 2,4 pentadione.
3. Alumina based system from an aqueous hydroxide precipitate of aluminum sec-butoxide, as well as alcohol based analogs.
4. Variations of the Epoxy Siliane system that follow the M:Si:Epoxy formula where M is Ti, Al, Zr, Y, Yb, or combinations thereof.

For an optically active system, the film is made optically reflective, scattering, or may be a light pump by doping with a rare earth. An example of an optically reflective film includes fabricating a rutile Titania dioxide Nano particle, of the nm scale in range of reflectance, this TiO2 would then be mixed into any of the transparent sols to give a performance benefit. A variation may be generated, for example, by using a Ceria doped YAG, by adding 0.2 to 0.5 mol % Ce to the YAG system that provides excitation yielding light output that may be leveraged as a light pump. It should be noted that this is not limited to CE, other rare earths, such that Eu, Nd, may be leveraged to tune the light output to the system of interest.

Figure 9:
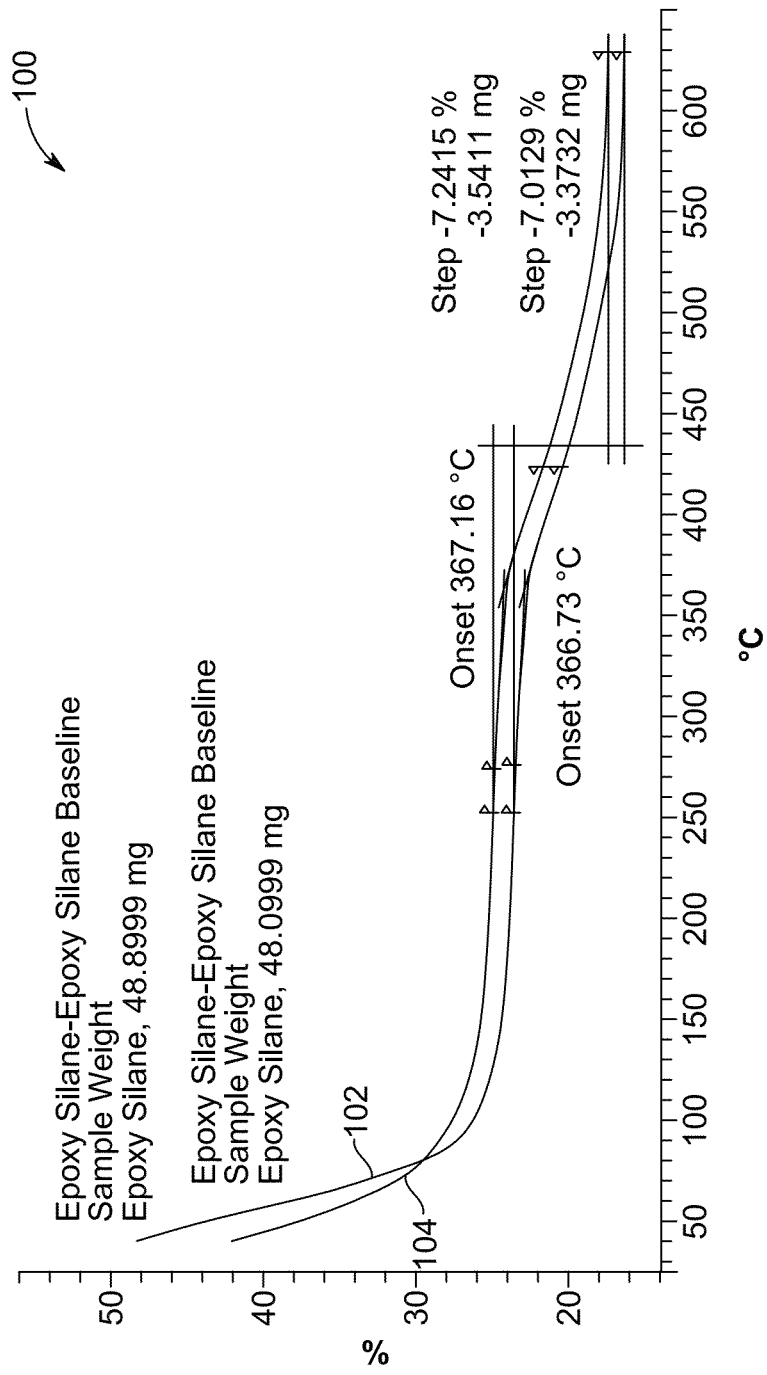
FIG. 9 is a graph illustrating an analysis of a cured film provided in accordance with various embodiments.

FIG. 9 is a graph 100 illustrating TGA data of a dried silica film heated at a rate of 5° C./min up to 650° C. in an Ar atmosphere showing curves 102 and 104 for epoxy silane of 48.8999 mg and 48.0999 mg, respectively. It should be noted that, physisorbed solvent/water loss accounts for the weight loss up until about 150° C., then a minimal weight loss is measured between 150-367° C., and then about a 7% weight loss between 367° C. and 650° C. is measured. The weight loss above 367° C. is due to the decomposition of GPTMS as well as removal of chemibsorbed hydroxyl groups.

Thus, various embodiments provide a smooth coat or smoother coat on the scintillators 42 (shown in FIG. 5). It should be noted that in various embodiments, the pH and viscosity of the sol is measured just before coating of the packs 84. In particular, with respect to the method 60, transmission measurements on glass slides showed that the cured films were transparent and optical profilometry was used to measure the surface roughness of individual pixels. The smooth coat reduces the roughness along the sides of the scintillator pixel 22 such that photons emitted from the scintillator (after x-ray excitation) undergo less reflections as the photons migrate down to the base of the pixel 22. In operation, less reflections translate to a larger percentage of emitted photons hitting the photodiode detector and accordingly a more sensitive detector.

Figure 10:
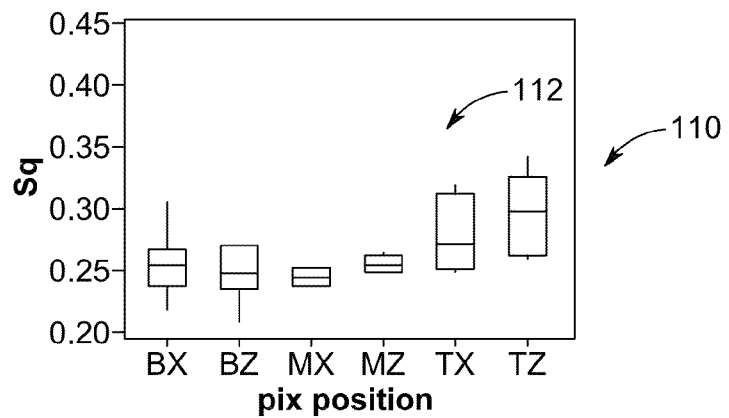
FIG. 10 is a box plot illustrating roughness versus position of a coated scintillator array in accordance with various embodiments.

The surface roughness was measured via optical profilometry measurements. First, six sigma principles were used to characterize the surface roughness of uncoated pixels. The pixilated scintillator is formed by taking a solid wafer of ceramic scintillator material (e.g., a ceramic garnet scintillator material) and wire sawing the wafer in two perpendicular directions (the x and z directions). In order to establish a baseline roughness, optical profilometry (OP) was used (50×1 objective) to measure the average ($S_a$) and root mean square surface roughness ($S_q$) of individual pixels that were broken off from a cleaned uncoated pack. Six pixels from three different packs were measured in six different locations per pixel: the top, middle and bottom along both the x and z sides of the pixels. The results are shown in the graph 110 of FIG. 10 showing a box plot 112. As can be seen, the box plot 112 shows that there is no statistical difference between the average roughness along the x versus z side of the pixels, and there is also no significant difference in the roughness between the top, middle and bottom portions of the uncoated pixels. The rms roughness from this study was 0.25 µm. This measurement was repeated twice at different times within a year and was consistently measured to be 0.24 or higher.

Figure 11:
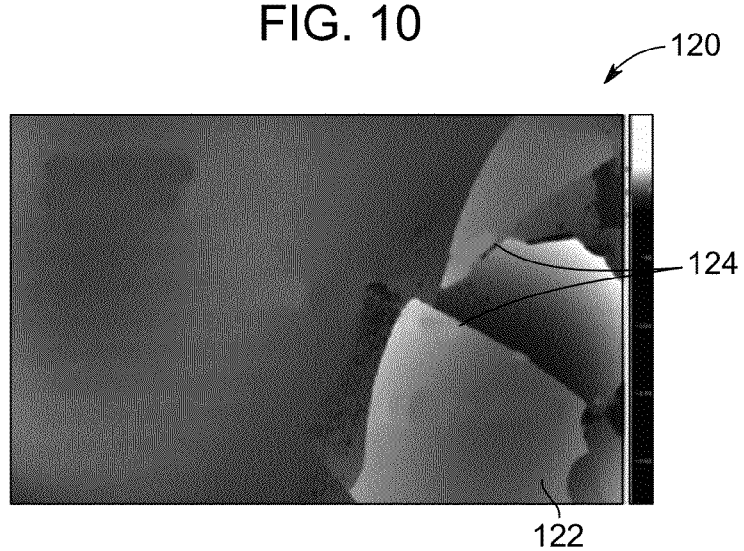
FIG. 11 is an image showing a crack in a coated scintillator array.

With a baseline $S_q$ in place, the roughness of coated pixels may be characterized. An OP image 120 of a coated pack that was coated without the method 60 is shown in FIG. 11. The image 120, which is centered at 65% down from the top of the pixel, shows where the smooth coat 122 ends and the bare pixel begins. As can be seen, these coatings were thick and contained several cracks 124.

Figure 12:
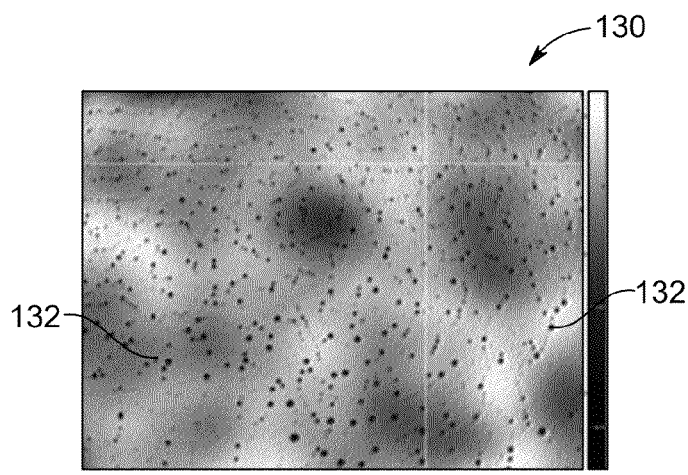
FIG. 12 is an image showing pores in a coated scintillator array.

In some packs kept under vacuum for more than about 1 minute immediately after coating, pores 132 were observed in the coating as shown in the OP image 130 of FIG. 12. However, in areas where smooth coat was present, $S_q$ values as low as 0.06 were measured, indicating a reduction in roughness by more than a factor of 4 relative to uncoated pixels.

Figures 13, 14:
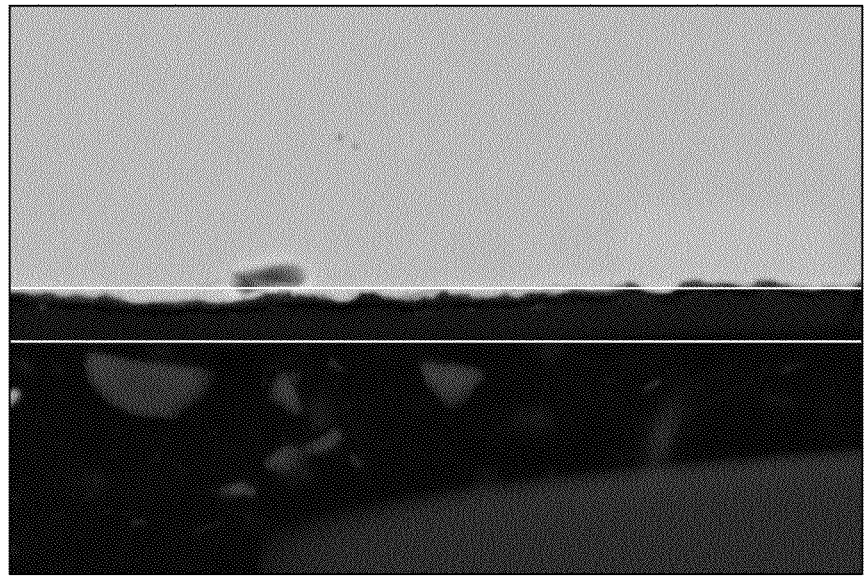
FIG. 13 is a table of optical profilometry data of coated pixels in accordance with various embodiments.
FIG. 14 is an image of a pixel cross-section showing a smoothing layer in accordance with various embodiments.

Using various embodiments, the surface roughness of coated packs was measured using optical profilometry. The ratio of surface roughness of the uncoated:coated pixels was taken to determine the factor by which the surface roughness was decreased. The table 140 in FIG. 13 shows the results of one pack whereby two pixels were broken off from different areas of a coated pack. Measurements along the top, middle and bottom of the coated pixels show that the average surface roughness is decreased by up to a factor of 6.5 times that of the uncoated pixels. The trend that developed is that this smoothing of the surface by the sol gel coat was at a maximum at the top of the pixels and was at a minimum at the base of the pixels. In the example in FIG. 13, the top of the pixels had a surface roughness that was reduced by a factor of 6.5 while the base of the pixels had a surface roughness that was reduced by a factor of 1.6, which resulted from manner in which the packs were dried. A main failure mode in drying right side up is in plugging at the top of the kerf while the main failure mode in drying the packs pixel side down is that the sol slowly flows towards the top of the pixel until the sol dries. However, OP and SEM showed that smooth coat is present at the base of the pixel. In addition to optical profilometry, the SEM image 150 in FIG. 14 shows a smooth coat thickness of 3.4 microns.

Figure 15:
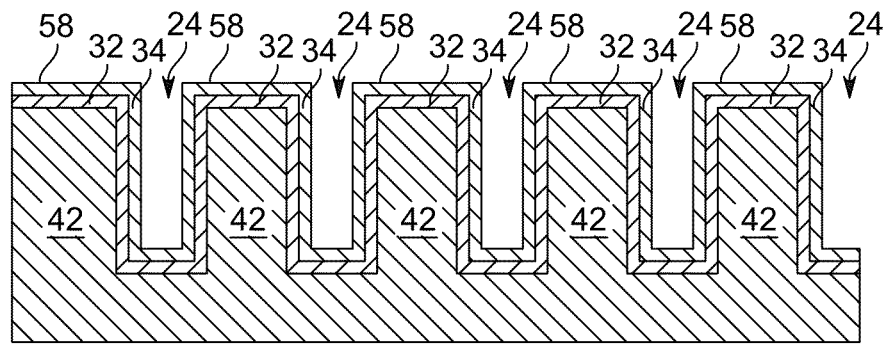
FIGS. 15-17 are schematic side views of the scintillator substrate illustrating a coating process in accordance with various embodiments.
Figure 16:
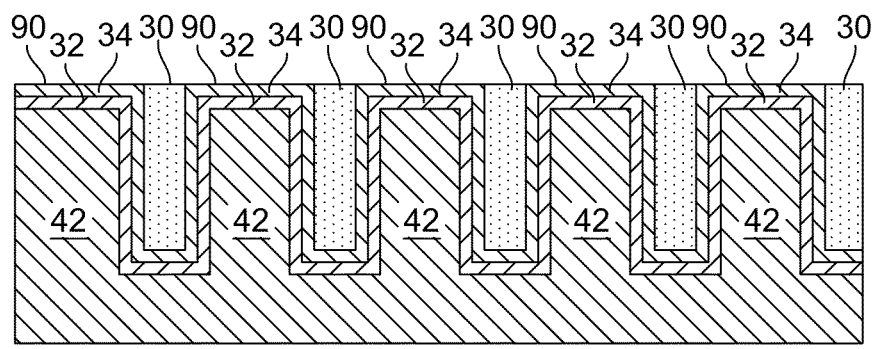

Thus, the scintillators 42 shown in FIG. 5 may be coated in accordance with various embodiments. For example, as shown in FIG. 15, following formation or definition of the individual scintillators 42, the smoothing layer 32 is applied or coated onto the scintillators 42 and into the gaps 24. In particular, the smoothing layer 32 may first be applied to the gaps 24 using, for example, the method 60 described herein. The optical reflector layer 34 is then applied, for example, using a non-line of sight process, such as chemical vapor deposition, physical vapor deposition, sputtering, via chemical reduction from a liquid phase or gas phase metallization. In some embodiments, the optical reflector layer 34 may be applied using gas phase metallization. Thereafter, the gap 24 remains.

The smoothing layer 32 and/or the optical reflector layer 34 are cured separately in various embodiments, such as in different processing steps. In some embodiments, a passivation layer 36 (as shown in FIG. 1) may be applied and cured thereon. After any such desired curing, the top surface or portion of the scintillator array may be machined to leave a top reflective layer 58 that has a desired thickness, for example, of from about 100 microns to 200 microns.

The x-ray absorbing material 30 (or in some embodiments a light-absorbing composite layer) may be deposited and filled into each gap 30. For example, in some embodiments, the x-ray absorbing material 30 comprises a metal having a high x-ray stopping power. In various embodiments, the metal is in the form of a powder with a particle size of from about 0.5 microns to about 5 microns. The x-ray absorbing material 30 may further comprise a low viscosity polymer, such as an epoxy, polyurethane that acts as a binder for the metal powder therein. The light-absorbing composition is then cast into the gaps 30. After casting, the x-ray absorbing material 30 is cured.

It should be appreciated that other methods may be used to deposit the x-ray absorbing material 30. For example, the metal particles may be coated with an adhesive binder material such as a thermoplastic polymer coating. The coated metal particles would then be cast into the gaps 24 with a small amount of solvent, such as an alcohol. The solvent may then be vaporized, and the resultant dried material heated to melt the thermoplastic coating, thereby binding the metal particles together. Another method includes coating the metal particles with tungsten or with low temperature solder film. The solder film is then melted after the composition is cast into the gap 24. After the light absorbing composite is deposited by the desired method, the scintillator array is ground or milled on the top surface to remove any extra light absorbing composite and layer materials.

Figure 17:
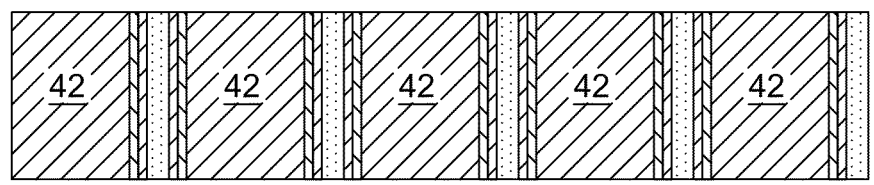

Once the x-ray absorbing material 30 interstitially disposed in the gaps 24 has cured, the scintillator array is then machined to a final and desired dimension. Additionally, the bottom portion of the scintillator substrate is machined or ground to remove extra scintillator and to attain a final and desired thickness as shown in FIG. 17. For example, depending on the type of scintillator being fabricated, the final thickness ranges from about 1.5 mm to about 3 mm. The machined surface then may be optically coupled to, for example, a photodiode in accordance with CT detector fabrication assembly.

Figure 18:
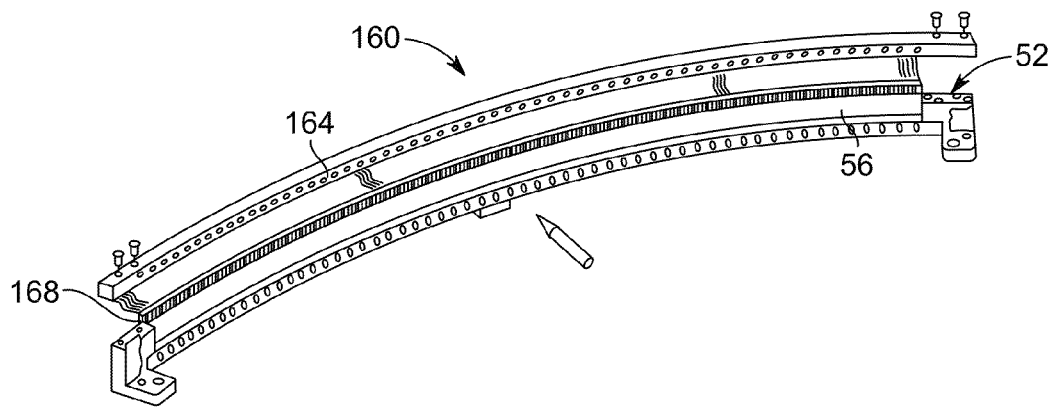
FIG. 18 is a perspective view of a detector array having a scintillator array in accordance with various embodiments.
Figure 19:
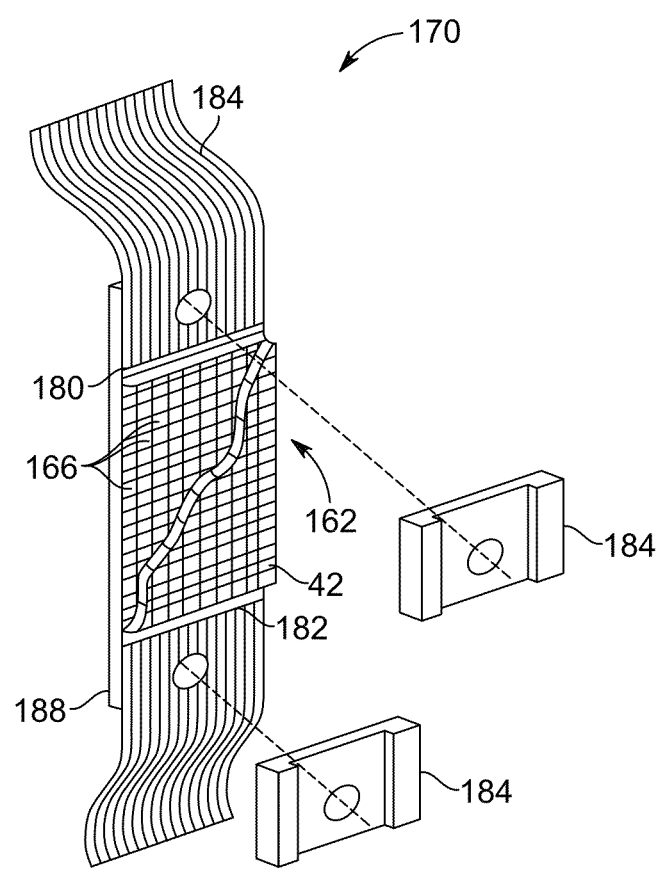
FIG. 19 is a perspective view of a detector in accordance with one embodiment of a scintillator array.

A detector array comprising the scintillator array also may be provided. As shown in FIGS. 18 and 19, the detector array 160 includes a plurality of scintillators 42 forming a scintillator array 162. A collimator (not shown) is positioned above scintillator array 162 to collimate x-ray beams before such beams impinge upon scintillator array 162.

As shown in FIG. 18, the detector array 160 includes 57 detectors 164, with each detector 164 having an array size of 16×16. As a result, the detector array 160 has 16 rows and 912 columns (16×57 detectors) which allows 16 simultaneous slices of data to be collected with each rotation of detector array 160. FIG. 19 illustrates a detector 170. As shown in the cut-away detail, the photodiodes 166 are formed as a substantially planar array, typically from a single silicon wafer. The scintillator array 162 is positioned and bonded to the photodiodes 166 in one embodiment by means of an optically transparent adhesive (not shown), with the uncoated face of the scintillators 42 aligned directly facing the matching array of photodiodes 166. In this manner, the light generated within each of the scintillators 42 is transmitted to a corresponding photodiode 166. It should be noted that each detector 170 has the approximate geometry of a rectangular prism, i.e., pairs of parallel, orthogonal, flat faces.

FIG. 18 illustrates the detector array 160. In order to form the curved geometry of the detector array, a plurality of detectors 170 are each secured to a detector frame 168 as adjacent chords of the arc defined by the detector frame 168. In this embodiment, the detectors 170 are mounted to the face of the detector frame 168 having the larger radius of curvature (i.e., the rear face of the frame, as shown in FIG. 18).

Switch arrays 180 and 182, shown in FIG. 19, are multi-dimensional semiconductor arrays coupled between scintillator array 162 and a data acquisition system (not shown) operatively disposed relative to scintillator array 162. The switch arrays 180 and 182 include a plurality of field effect transistors (FETs) (not shown) arranged as a multi-dimensional array. The FET array includes a number of electrical leads connected to each of the respective photodiodes 166 and a number of output leads electrically connected to the data acquisition system via flexible electrical interface 184. More particularly, about one-half of photodiode outputs are electrically connected to switch array 180 with the other one-half of photodiode outputs electrically connected to switch array 182. Additionally, the coated layers are described herein are interposed between each scintillator 42. Each detector 170 is secured to the detector frame 168 by mounting brackets 184.

The switch arrays 180 and 182 may further include a decoder (not shown) that enables, disables, or combines photodiode outputs in accordance with a desired number of slices and slice resolutions for each slice. In some embodiments, the decoder may be a decoder chip or FET controller as known in the art. The decoder also includes a plurality of output and control lines coupled to switch arrays 180 and 182 and the data acquisition system. In one embodiment defined as a 16 slice mode, the decoder enables switch arrays 180 and 182 so that all rows of the photodiode array 188 are activated, resulting in 16 simultaneous slices of data for processing by the data acquisition system. However, as should be appreciated, other slice combinations are possible. For example, the decoder may also select from other slice modes, including one, two, and four-slice modes.

Thus, various embodiments provide an inorganic/organic silica-based sol for coating scintillator pixels. The coated pixels may provide a decrease in surface roughness with minimal bridging and cracking. For example, in some embodiments, sols having the properties of a 4-5 TEOS:GPTMS, a pH=3-4, a viscosity=2.2-3.5 cP, with a mixture of alcohol solvents may be used to provide uniform coatings.

It should be noted that variations and modifications are contemplated. For example, in some embodiments, $TiCl_4$ may be used to coat the packs in the CVD chamber to encourage nucleation. Introducing $TiO_2$ directly into the sol during synthesis may also be provided.

The various embodiments and/or components, for example, modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, flash drive, jump drive, USB drive and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the described subject matter without departing from their scope. While the dimensions and types of materials described herein are intended to define the parameters of the various embodiments, the embodiments are by no means limiting and are exemplary embodiments. Many other embodiments will be apparent to one of ordinary skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable one of ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A scintillator array, comprising:
   a scintillator substrate having a plurality of scintillators spaced apart by gaps within the scintillator substrate;
   a smoothing layer overlaying a surface of the scintillator substrate within the gaps, the smoothing layer comprising an organically modified silicate; and
   an optical reflector layer overlaying a surface of the smoothing layer within the gaps, wherein the organically modified silicate comprises 3-glycidoxypropyltrimethoxysilane (GPTMS).

2. The scintillator array of claim 1, wherein the organically modified silicate comprises GPTMS added to tetraethylorthosilicate (TEOS).

3. The scintillator array of claim 2, wherein a TEOS:GPTMS ratio is between about 4:1 and about 5:1.

4. The scintillator array of claim 1, wherein the smoothing layer comprises a cured 3-glycidoxypropyltrimethoxysilane (GPTMS) copolymerized with an inorganic tetraethylorthosilicate (TEOS)-based silica sol.

5. The scintillator array of claim 4, wherein the TEOS-based silica sol has a pH between about 3 and about 4.

6. The scintillator array of claim 5, wherein the TEOS-based silica sol has a viscosity between about 2.2 centipoise (cP) and about 3.5 cP.

7. The scintillator array of claim 1, further comprising an x-ray absorbing material filling the gap.

8. The scintillator array of claim 1, wherein the scintillator substrate comprises $Tb_{2.955} Lu_{0.05} Ce_{0.005} Al_{4.99} O_{12}$.

9. A method for producing a coated scintillator array, the method comprising:
   synthesizing an inorganic silica sol;
   synthesizing an organically modified silicate (ormosil) sol using a reaction of copolymerizing 3-glycidoxypropyltrimethoxysilane (GPTMS) with the inorganic silica sol;
   coating a scintillator array with the ormosil sol; and
   drying and curing the coated scintillator array.

10. The method of claim 9, wherein synthesizing the ormosil sol comprises using a tetraethylorthosilicate (TEOS)-based silica sol.

11. The method of claim 9, wherein coating the scintillator array comprises using a peristaltic pump to cause the ormosil sol to penetrate into gaps of a scintillator substrate of the scintillator array.

12. The method of claim 9, wherein coating the scintillator array comprises using a magnetically stirred sol bath to cause the ormosil sol to penetrate into gaps of a scintillator substrate of the scintillator array.

13. The method of claim 9, wherein coating the scintillator array comprises using sonication in a sol gel bath to cause the ormosil sol to penetrate into gaps of a scintillator substrate of the scintillator array.

14. The method of claim 9, wherein the ormosil sol comprises GPTMS added to tetraethylorthosilicate (TEOS) and synthesizing the ormosil results in a TEOS:GPTMS ratio between about 4:1 and about 5:1.

15. The method of claim 9, wherein the inorganic silica sol comprises a tetraethylorthosilicate (TEOS)-based silica sol having a pH between about 3 and about 4.

16. The method of claim 15, wherein the TEOS-based silica sol has a viscosity between about 2.2 centipoise (cP) and about 3.5 cP.

17. The method of claim 9 further comprising filling gaps of a scintillator substrate of the scintillator array with an x-ray absorbing material.

18. An x-ray detector comprising:
   a detector array;
   a scintillator array adjacent the detector array and having a plurality of scintillators spaced apart by gaps within the scintillator substrate to form pixels;
   a smoothing layer overlaying a surface of the scintillator array within the gaps, the smoothing layer comprising an organically modified silicate; and
   an optical reflector layer overlaying a surface of the smoothing layer within the gaps.

19. The x-ray detector of claim 18, wherein the organically modified silicate comprises 3-glycidoxypropyltrimethoxysilane (GPTMS) added to tetraethylorthosilicate (TEOS) and having a TEOS:GPTMS ratio between about 4:1 and about 5:1.

* * * * *